US010864631B2

United States Patent
Davidson et al.

(10) Patent No.: US 10,864,631 B2
(45) Date of Patent: Dec. 15, 2020

(54) ROBOTIC GRASPING PREDICTION USING NEURAL NETWORKS AND GEOMETRY AWARE OBJECT REPRESENTATION

(71) Applicant: Google LLC, Mountain View, CA (US)

(72) Inventors: James Davidson, Alameda, CA (US); Xinchen Yan, Cupertino, CA (US); Yunfei Bai, Fremont, CA (US); Honglak Lee, Mountain View, CA (US); Abhinav Gupta, Santa Clara, CA (US); Seyed Mohammad Khansari Zadeh, San Carlos, CA (US); Arkanath Pathak, Darling Harbour (AU); Jasmine Hsu, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/617,169

(22) PCT Filed: Jun. 18, 2018

(86) PCT No.: PCT/US2018/038082
§ 371 (c)(1),
(2) Date: Nov. 26, 2019

(87) PCT Pub. No.: WO2018/236753
PCT Pub. Date: Dec. 27, 2018

(65) Prior Publication Data
US 2020/0094405 A1 Mar. 26, 2020

Related U.S. Application Data

(60) Provisional application No. 62/522,059, filed on Jun. 19, 2017.

(51) Int. Cl.
*B25J 9/16* (2006.01)

(52) U.S. Cl.
CPC ............ *B25J 9/1612* (2013.01); *B25J 9/161* (2013.01); *B25J 9/1669* (2013.01); *B25J 9/1697* (2013.01)

(58) Field of Classification Search
CPC ... B25J 9/16; B25J 9/1612; B25J 9/161; B25J 9/1669; B25J 9/1697; G06F 19/00
See application file for complete search history.

(56) References Cited

U.S. PATENT DOCUMENTS

2020/0061811 A1* 2/2020 Iqbal ..................... B25J 9/161
2020/0147804 A1* 5/2020 Sugiyama ............. B25J 9/1697
(Continued)

OTHER PUBLICATIONS

Lenz, I. et al.; Deep Learning for Detecting Robotic Grasps; The International Journal of Robotics Research; 17 Pages; dated 2015.
(Continued)

*Primary Examiner* — Kira Nguyen
(74) *Attorney, Agent, or Firm* — Middleton Reutlinger

(57) ABSTRACT

Deep machine learning methods and apparatus, some of which are related to determining a grasp outcome prediction for a candidate grasp pose of an end effector of a robot. Some implementations are directed to training and utilization of both a geometry network and a grasp outcome prediction network. The trained geometry network can be utilized to generate, based on two-dimensional or two-and-a-half-dimensional image(s), geometry output(s) that are: geometry-aware, and that represent (e.g., high-dimensionally) three-dimensional features captured by the image(s). In some implementations, the geometry output(s) include at least an encoding that is generated based on a trained encoding neural network trained to generate encodings that represent three-dimensional features (e.g., shape). The trained grasp outcome prediction network can be utilized to (Continued)

generate, based on applying the geometry output(s) and additional data as input(s) to the network, a grasp outcome prediction for a candidate grasp pose.

20 Claims, 10 Drawing Sheets

(56) References Cited

U.S. PATENT DOCUMENTS

2020/0189097 A1* 6/2020 Ikeda ............... B25J 9/1669
2020/0189105 A1* 6/2020 Wen ................. B25J 9/161

OTHER PUBLICATIONS

Redmon, Joseph, and Anelia Angelova. "Real-Time Grasp Detection Using Convolutional Neural Networks." arXiv preprint arXiv:1412.3128 (2014). Jan. 1, 2014.
Kumra, S. et al.; "Robotic Grasp Detection Using Deep Convolutional Neural Networks," ARXIV: 1611.08036V3, pp. 1-8, XP055503622; dated Feb. 24, 2017 Feb. 24, 2017.
Gupta, A.; Using Manipulation Primitives for Object Sorting in Cluttered Environments; Automation Science and Engineering; pp. 1-7; dated 2015.
Finn, C., et al.; Unsupervised Learning for Physical Interaction through Video Prediction; Advances in Neural Information Processing Systems; pp. 1-9; dated 2016.
Yang, J., et al.; Weakly-supervised Disentangling with Recurrent Transformations for 3D View Synthesis; Advances in Neural Inforamtion Processing Systems; pp. 1-9; dated 2015.
Rezende, D. J.,; Unsupervised Learning of 3D Structure from Images; Advances in Neural Inforamtion Processing Systems; pp. 1-9; dated 2016.
Li, M., et al.; Dexterous Grasping under Shape Undertainty; Robotics and Autonomous Systems; 27 Pages; dated 2016.
Mahler J., et al.; Dex-Net 2.0: Deep Learning to Plan Robust Grasps with Synthetic Point Clouds and Analytic Grasp Metrics; 12 Pages; dated 2017.
Mahler J., et al.; Dex-net 1.0: A Cloud-based Network of 3d Objects for Robust Grasp Planning Using a Multi-armed Bandit Model with Correlated Rewards; In Robotics and Automation; 8 Pages; dated 2016.
Bohg, J.; Data-driven Grasp Synthesis—a Survey; Transactions on Robotics; p. 1-21; dated 2014.
Kehoe, B. et al.; Cloud-based Robot Grasping with the Google Object Recognition Engine; Robotics and Authomation; 8 Pages; dated 2013.
Nikandrova et al.; Category-based Task Specific Grasping; Robotics and Autonomous Systems; pp. 25-35; dated Aug. 2015.

Oberlin et al.; Autonomously Acquiring Instance-Based Object Models from Experience; Int. S. Robotics Research (ISRR); pp. 1-16; dated 2015.
J. Oh, et al.; Action-conditional Video Prediction Using Deep Networks in Atari Games. In Advances in Neural Information Processing Systems; pp. 1-9; dated 2015.
Pinto, L., et al.; The Curious Robot: Learning Visual Representations Via Physical Interactions; European Conference on Computer Vision; pp. 1-17; dated 2016.
Goldfeder, C., et al.; The Columbia Grasp Databas; Robotics and Automation; 7 Pages; dated 2009.
Pinto, L., et al.; Supersizing Self-supervision: Learning to Grasp from 50K Tries and 700 Robot Hours; Robotics and Automation; 8 Pages; dated 2016.
Jaderberg, M., et al.; Spatial Transformer Networks; Advances in Neural Information Processing Systems; pp. 1-9; dated 2015.
Dang, H., et al.; Semantic Grasping: Planning Task-specific Stable Robotic Grasps; Autonomous Robots; 16 Pages; dated 2014.
Yan, X., et al.; Perspective Trasnformer Nets: Learning Single-Veiw 3D Object Reconstruction without 3D Supervision; Advances in Neural Information Processing Systems; p. 1-9; dated 2015.
Katz, D., et al.; Perceiving, Learning, and Exploiting Object Affordances for Autonomous Pile Manipulation; Autonomous Robots; 9 Pages; dated 2014.
Vahrenkamp, N., et al.; Part-based Grasp Planning for Familiar Objects; Humanoid Robots; 7 Pages; dated 2016.
Kumar, V., et al.; Optimal Control with Learned Local Models: Application to Dexterous Manipulation; Robotics and Automation; dated 2016.
Dosovitskiy, A. et al.; Learning to Act by Predicting the Future; pp. 1-14; dated 2016.
Gupta, A., et al.; Learning Dexterous Manipulation for a Soft Robotic Hand from Human Demonstrations; Intelligent Robots and Systems; 9 Pages; dated 2016.
European Patent Office; International Search Report and Written Opinion of Ser. No. PCT/US2018/038082; 14 pages; dated Sep. 26, 2018.
European Patent Office, Intention to Grant issued in Application No. 18740382.9, 54 pages; dated Nov. 22, 2019.
Dyrstad, J.; Training Convolutional Neural Networks in Virtual Reality for Grasp Detection from 3D Images; URL: https://pdfs.semanticscholar.org/4215/e52a0a19478b1c29aa79c443085bb548f562.pdf?_ga=2.152861371.361932155.1593693877-869076632.1593517960; dated Jun. 30, 2016.
Wang et al.; Robot Grasp Detection Using Multimodal Deep Convolutional Neural Networks; Advances in Mechanical Engineering; vol. 8 No. 9; dated Sep. 1, 2016.
Lenz et al.; Deep learning for Detecting Robotic Grasps; International Journal of Robotics Research; vol. 34, No. 4-5; dated Mar. 16, 2015.
European Patent Office; Communication issued in Application No. 20167061.9; 10 pages; dated Jul. 13, 2020.

* cited by examiner

ROBOTIC GRASPING PREDICTION USING NEURAL NETWORKS AND GEOMETRY AWARE OBJECT REPRESENTATION

BACKGROUND

Many robots utilize one or more end effectors to grasp various objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

Various implementations of this specification are directed generally to deep machine learning methods and apparatus related to determining a grasp outcome prediction for a candidate grasp pose of an end effector of a robot. The grasp outcome prediction can be a measure that indicates a likelihood of successful grasp of an object if a grasp of the object is attempted by the end effector when at the candidate grasp pose. In some implementations, if it is determined that the grasping outcome prediction satisfies one or more criteria (e.g., a probability threshold), then control commands can be provided to one or more actuators of the robot to cause the end effector to attempt a grasp of the object at the candidate grasp pose of the end effector.

Some implementations are directed to training and utilization of both a geometry network and a grasp outcome prediction network. The geometry network and the grasp outcome prediction network can each include at least one trained neural network model. The trained geometry network can be utilized to generate, based on two-dimensional ("2D") or two-and-a-half-dimensional ("2.5D") image(s) (2D with depth), geometry output(s) that are: geometry-aware, and that represent three-dimensional ("3D") geometry features (e.g., shape, location, orientation) of object(s) captured by the image(s). The image(s) can be captured by a vision sensor of the robot, such as a vision sensor that captures 2D or 2.5D vision sensor data. For example, the geometry features of an object represented by the geometry output(s) can include at least the 3D shape of the object.

The geometry output(s) can include a global geometry representation, such as an encoding that is a high-dimensional geometry representation. The encoding can be generated based on application (or provision) of an image to a neural network encoder, such as a convolutional neural network ("CNN") encoder. As described herein, a neural network encoder can be trained so that encodings, generated utilizing the neural network encoder, represent 3D features of object(s) captured by the image. Moreover, the geometry output(s) can additionally or alternatively include a local geometry representation that is: geometry-aware, and that is locally focused on an area of the object that is near the candidate grasp pose. For example, the local geometry representation can be generated based on dense sampling of a global geometry representation that is an encoding, where the dense sampling is from the perspective of the candidate grasp pose of the end effector (e.g., dense sampling that is from a frame of reference of the candidate grasp pose). In these and other manners, the local geometry representation can represent 3D features of the object from a perspective of the candidate grasp pose.

The trained grasp outcome prediction network can be utilized to generate, based on applying the geometry output(s) and additional data as input(s) to the network, a grasp outcome prediction for a candidate grasp pose. The additional data applied to the grasp outcome prediction network can include, for example, the candidate grasp pose, a pre-grasp image, and/or a pre-grasp vision sensor pose.

Some implementations described herein can train the geometry network and/or the grasp outcome prediction network utilizing training instances generated through user guided grasp attempts in a virtual reality environment. For example, the virtual reality ("VR") environment can render a virtual environment that includes a representation of an object, and optionally additional scene object(s), along with a representation of an end effector of a robot, and optionally additional robot component(s). Through interaction with user interface input device(s) (e.g., a VR controller), a user can manipulate the pose of the end effector in the VR environment and cause a grasp of the object to be attempted when the user has manipulated the end effector to a desired pose for grasping. For example, the user can provide user interface input (e.g., a click, a verbal command) to cause a grasp to be attempted when the user determined the end effector is at a desired pose for grasping an object rendered in the virtual environment. A physics engine of the VR environment can be utilized to determine whether the attempted grasp was successful. Various data from the VR environment and the user's interactions via the environment can be utilized in generating a training instance. For example, image(s) generated from the VR environment, the desired pose, and the actual grasp outcome can be utilized to generate a training instance.

In some of those implementations, additional training instances are automatically generated (e.g., without requiring an additional user-guided grasp attempt) based on user guided grasp attempt(s). For example, in generating an additional training instance, a new grasp pose can be determined based on a grasp pose from a user-guided grasp attempt. For instance, a new grasp pose can be selected that is within a desired variance (e.g., +/−X centimeters for position and/or +/−X degrees for orientation) of the grasp pose from the user-guided grasp attempt. Further, the object and the scene from the user-guided grasp attempt can be utilized (e.g., the same object pose can be utilized), and a new grasp attempt can be attempted in the VR environment utilizing the new grasp pose. The physics engine of the VR environment can be utilized to determine whether the new attempted grasp was successful. Various data from the new grasp attempt can be utilized in generating the additional training instance. For example, the new grasp pose and the new grasp outcome can be utilized to generate the additional training instance. Image(s) from the new grasp attempt and/or from the user-guided attempt can further be included in the additional training instance. In these and other manners, significant quantities of additional training instances can be generated and utilized in training the geometry network and/or the grasp outcome prediction network. Further, many of the additional training instances will be negative training instances (i.e., the grasp was not successful), as the selections of the new grasp poses will not be user-guided (but will instead be automatically selected using a prior user-guided grasp attempt as guidance).

Various implementations described above and elsewhere herein can achieve one or more technical advantages. For example, generation of geometry output(s) described herein and application of such geometry output(s) as input to a grasp outcome prediction network can result in improved grasp outcome prediction accuracy, and/or more robust grasp outcome prediction (e.g., adaptation to objects not trained upon) as compared to various techniques that do not utilize such geometry output(s). Also, for example, various neural network architectures described herein may result in improved performance as compared to various other grasp prediction architectures. For instance, architectures described herein can result in an increased rate of successful grasp of target objects. Also, for example, automatic generation of additional training instances utilizing techniques described herein may be more computational resource efficient than generation of additional training instances utilizing further user-guided grasp attempts—and/or may result in more robust training of various neural network models described herein.

In some implementations, a method is provided that includes identifying a current image captured by a vision sensor of a robot. The current image captures an end effector of the robot and an object to be grasped, by the robot, using the end effector. The method further includes generating an encoding of the current image, or an additional image that captures the object. The generated encoding encodes geometry features of the object, and generating the encoding includes processing the current image or the additional image using a trained neural network encoder. The method further includes determining a candidate grasp pose of the end effector. The method further includes: applying, as one or more inputs to a grasp outcome prediction network that is a trained neural network model: the current image, the candidate grasp pose, and the encoding; and generating, over the grasp outcome prediction network based on applying the one or more inputs, a grasp outcome prediction. The method further includes: determining that the grasp outcome prediction satisfies one or more criteria; and in response to the grasp outcome prediction satisfying the one or more criteria, providing control commands to one or more actuators of the robot to cause the end effector to attempt a grasp of the object at the candidate grasp pose of the end effector.

These and other implementations of the technology can include one or more of the following features.

In some implementations, the method further includes: generating a local geometry representation using the encoding and the candidate grasp pose of the end effector; and including the local geometry representation in the one or more inputs applied to the grasp outcome prediction network in generating the grasp outcome prediction. In some of those implementations, generating the local geometry representation includes performing dense sampling on the encoding from a frame of reference of (e.g., from a point of view of) the candidate grasp pose of the end effector.

In some implementations, the encoding is invariant to any vision sensor pose of the vision sensor and/or the trained neural network encoder is trained in conjunction with a three-dimensional neural network decoder.

In some implementations, the trained neural network encoder is trained based on applying training encodings generated over the neural network encoder to a three-dimensional decoder, generating training decodings using the three-dimensional decoder, determining losses based at least in part on the training decodings, and updating the neural network encoder based on the losses.

In some implementations, the geometry features encoded by the encoding include three-dimensional shape features of the object.

In some implementations, applying the one or more inputs to the grasp outcome prediction network includes: applying the current image as at least part of a first input, of the one or more inputs, to one or more first layers; and generating, over the first layers based on applying the first input, a first layers output. In some of those implementations, applying the one or more inputs to the grasping outcome prediction network further includes: applying the encoding and the first layers output as at least part of a second input, of the one or more inputs, to one or more second layers; and generating, over the second layers based on applying the second input, a second layers output. In some versions of those implementations, applying the one or more inputs to the grasping outcome prediction network further includes: applying the end effector pose and the second layers output as at least part of a third input, of the one or more inputs, to one or more third layers; and generating, over the third layers based on applying the third input, a third layers output. In some further versions of those implementations, the method further includes: generating a local geometry representation using the encoding and the candidate grasp pose of the end effector; applying the third layers output and the local geometry representation as at least part of a fourth input, of the one or more inputs, to one or more fourth layers; and generating, over the fourth layers based on applying the fourth input, the grasp outcome prediction.

In some implementations, determining the candidate grasp pose includes: generating a plurality of candidate grasp poses; and performing one or more iterations of cross-entropy optimization on the plurality of candidate grasp poses to select the candidate grasp pose from the plurality of candidate grasp poses.

In some implementations, the method further includes: identifying a current vision sensor pose of the vision sensor; and including the current vision sensor pose in one or more of the inputs applied to the grasp outcome prediction network.

In some implementations, a method is provided that includes: identifying a current image captured by a vision sensor of a robot; and generating an encoding of: the current image, or an additional image that captures the object. The current image captures an end effector of the robot and an object to be grasped by the robot using the end effector. The generated encoding encodes geometry features of the object, and generating the encoding includes processing the current image or the additional image using a trained neural network encoder. The method further includes: applying, as one or more inputs to a prediction network that is a trained neural network model: the current image and the encoding; generating a prediction over the prediction network based on applying the one or more inputs; determining that the outcome prediction satisfies one or more criteria; and in response to the prediction satisfying one or more criteria, providing, to one or more actuators of the robot, control commands that are based on the prediction.

Other implementations may include a non-transitory computer readable storage medium storing instructions executable by one or more processors (e.g., a central processing unit (CPU), a graphics processing unit (GPU), and/or a tensor processing unit (TPU)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
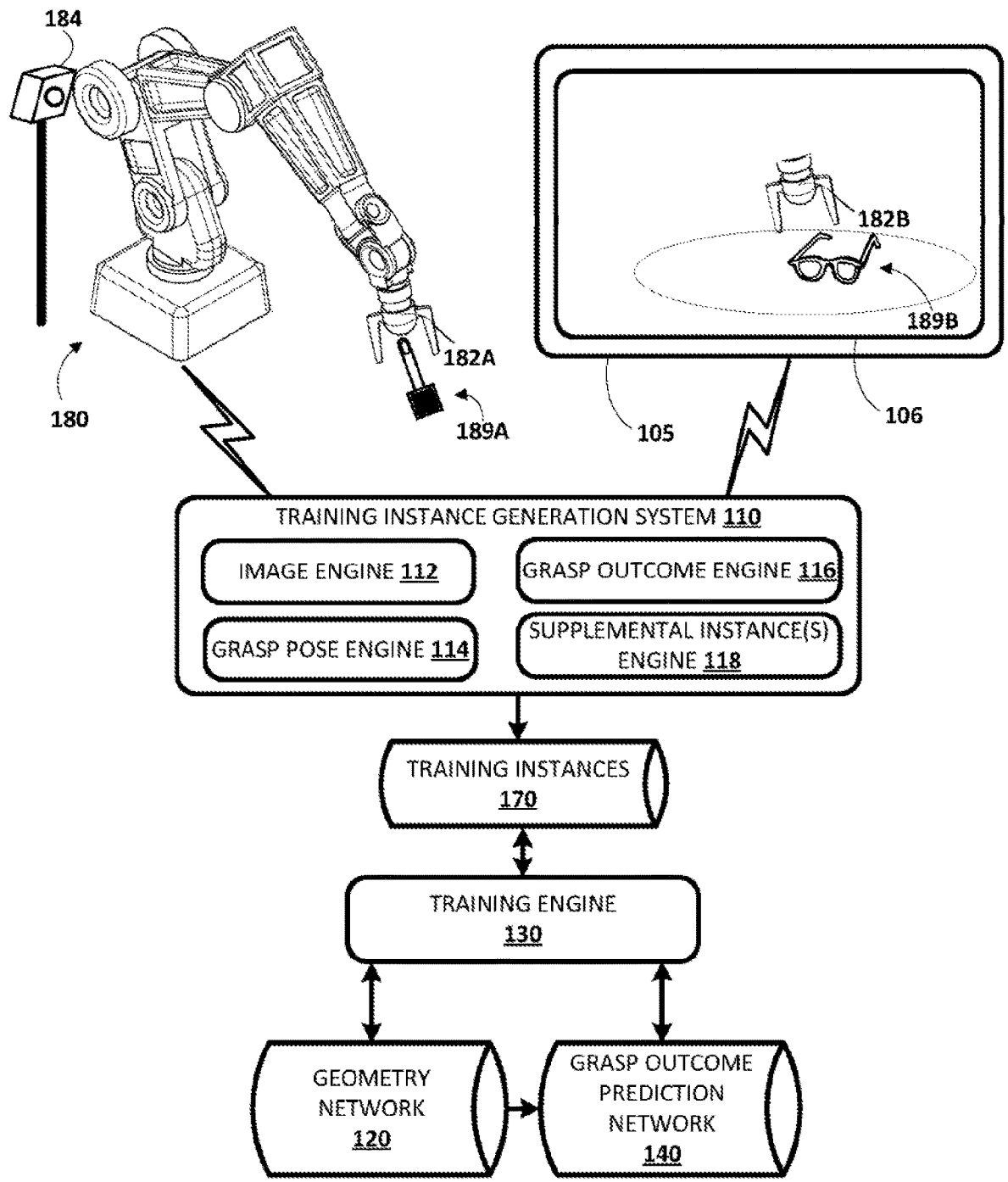
FIG. 1 illustrates an example environment in which implementations disclosed herein may be implemented.

FIG. 1 illustrates an example environment in which implementations described herein may be implemented. The example environment includes a robot 180, a computing device 105, a training instance generation system 110, a training instances database 170, a training engine 130, a geometry network 120, and a grasp outcome prediction network 140.

Training instance generation system 110 generates training instances based on user-guided demonstrations of grasp attempts. The training instance generation system 110 stores generated training instances in training instances database 170. A user-guided demonstration of a grasp attempt can include, for example: a physical manipulation of the robot 180 by the user to kinesthetically demonstrate a grasp; and/or user interactions with computing device 105 and/or associated component(s) to demonstrate the grasp attempt in a VR environment rendered by the computing device 105.

The training engine 130 utilizes training instances of training instances database 170 to train the geometry network 120 and the grasp outcome prediction network 140. Once trained, the geometry network 120 and the grasp outcome prediction network 140 can be utilized by the robot 180 and/or other robot(s) in determining how to grasp an object utilizing a corresponding end effector. For example, robot 180 can utilize the networks 120 and 140 in grasping spatula 189A, utilizing grasping end effector 182A. Additional description of the various components of FIG. 1 is now provided, with reference to various additional Figures herein.

Robot 180 is a "robot arm" having multiple degrees of freedom to enable traversal of grasping end effector 182A along any of a plurality of potential paths to position the grasping end effector 182A at a desired pose. As used herein, a "pose" can reference a position and/or orientation of a corresponding component it references. For example, "pose" can define both the position and the orientation of a corresponding component in all six dimensions of a six-dimensional space (e.g., a Euclidian space). A pose can optionally be defined by six values, each representing a corresponding value in a six-dimensional space.

Robot 180 controls the two opposed "claws" of its grasping end effector 182A to actuate the claws between at least an open position and a closed position (and/or optionally a plurality of "partially closed" positions). Example vision component 184 is also illustrated in FIG. 1. In FIG. 1, vision component 184 is mounted at a fixed pose relative to the base or other stationary reference point of robot 180. Vision component includes one or more vision sensors that can generate images related to color, depth, and/or other features of object(s) that are in the line of sight of the vision sensor(s). The vision component 184 may include, for example, a monographic camera (and optionally a depth sensor), a stereographic camera, or a laser scanner. When the vision component 184 is a monographic camera with a depth sensor, it can capture 2.5D images, such as an image with multiple color channels (e.g., "R, G, B" channels captured by a 2D camera sensor) and with a depth channel captured by the depth sensor. In some implementations, a stereographic camera can include two or more sensors, each at a different vantage point. In some of those implementations, the stereographic camera generates, based on characteristics sensed by the two sensors, images that each includes a plurality of data points defining depth values and color values and/or grayscale values. For example, the stereographic camera may generate images that include a depth channel and red, blue, and/or green channels. A laser scanner includes one or more lasers that emit light and one or more sensors that collect 2.5D data points related to reflections of the emitted light. An instance of such 2.5D data points is considered an image as that term is used herein. A laser scanner may be, for example, a time-of-flight laser scanner or a triangulation based laser scanner and may include a position sensitive detector (PSD) or other optical position sensor. The vision component 184 has a field of view of at least a portion of the workspace of the robot 180, such as the portion of the workspace that includes example spatula 189A. Although a resting surface for spatula 189A is not illustrated in FIG. 1, it may rest on a table, a tray, and/or other surface(s).

Robot 180 is provided as an example of a robot that can be utilized in various techniques described herein. For example, a user can physically manipulate the robot 180 to kinesthetically demonstrate a grasp, and data from sensors of the robot 180 during the kinesthetic demonstration, and image(s) captured by the vision component 184 in association with the kinesthetic demonstration, can be utilized by training instance generation system 110 in generating one or more training instances.

As another example, one or more processors of robot 180 can additionally and/or alternatively utilize trained versions of geometry network 120 and grasp outcome prediction network 140 in grasping an object, such as spatula 189A, utilizing end effector 182A.

Figure 2:
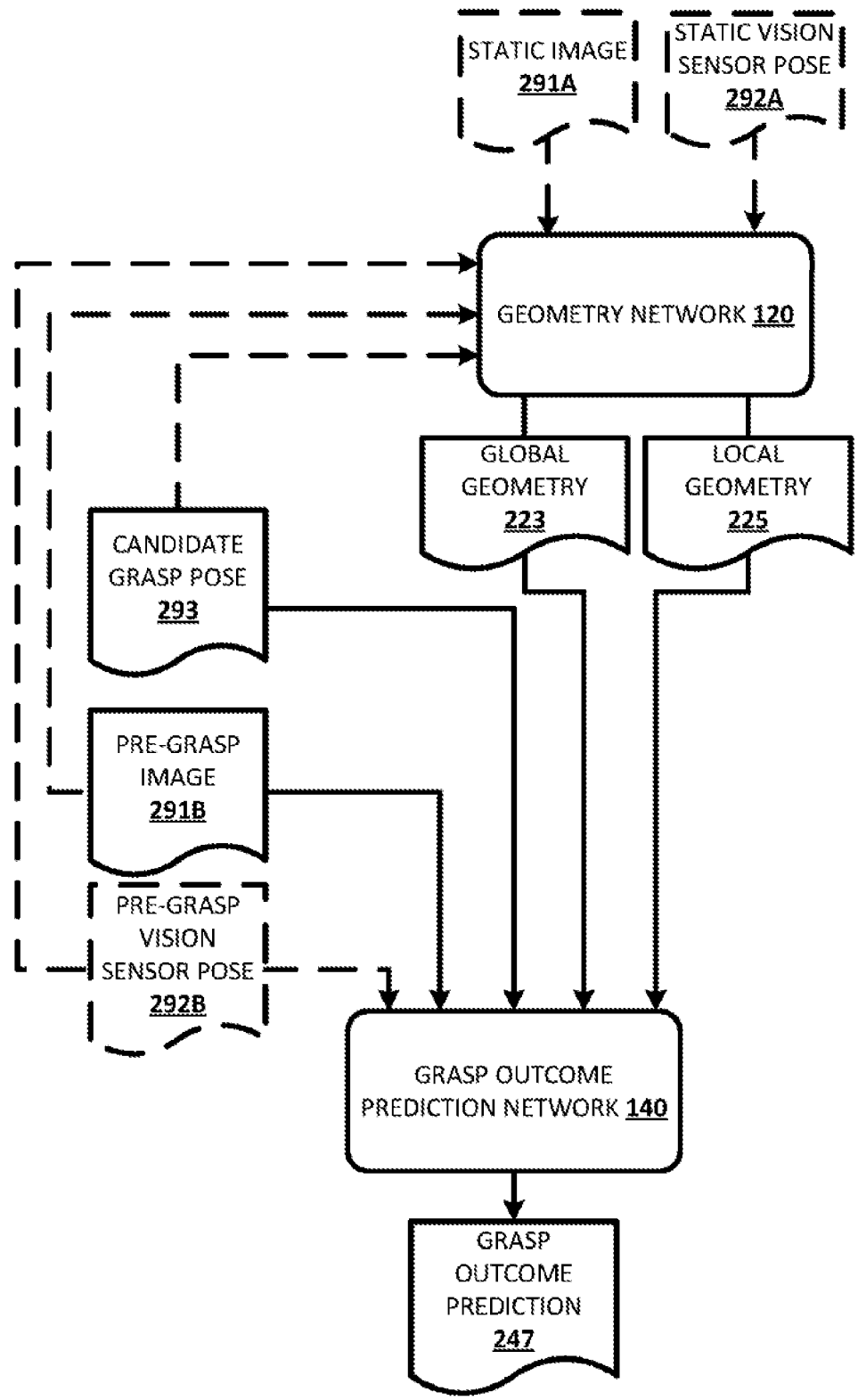
FIG. 2 illustrates a geometry network and a grasp outcome prediction network, and examples of data that may be applied to the networks to generate a grasp outcome prediction.

Referring to FIG. 2, one particular example is provided of utilizing trained versions of geometry network 120 and grasp outcome prediction network 140 in grasping an object. A static image 291A (and optionally a static vision sensor pose 292A) are applied as one or more inputs to geometry network 120—or a pre-grasp image 291B (and optionally a pre-grasp vision sensor pose 292B) are applied as the one or more inputs to the geometry network 120. For example, one or more processors of the robot 180 can apply the image 291A or 291B and optionally the corresponding vision sensor pose 292A or 292B.

The images 291A and 291B can each be a 2D or 2.5D image captured by vision component 184 of the robot 180. The static vision sensor pose 292A can be the pose of the vision component 184 (e.g., the pose of a vision sensor of the vision component) at the time the static image 291A was captured, and the pre-grasp vision sensor pose 292B can be the pose of the vision component 184 at the time the pre-grasp image 291B was captured. A vision sensor pose can be fixed (e.g., in the case of a stationary vision sensor) or can be determined based on localization techniques that rely on one or more inputs (e.g., input(s) from sensor(s) of the robot 180 such as an inertial measurement unit (IMU)). The static image 291A can be, for example, an image that captures the spatula 189A while the end effector 182A is positioned so that it is not in the static image 291A and/or does not occlude the spatula 189A in the static image 291A. In other situations, the end effector 182A may be in the static image 291A and/or occlude the spatula 189A in the static image 291A. The pre-grasp image 291B can be "later in time" than the static image 291A and may be, for example, a current image such as a recently captured (e.g., the most recently captured) image.

One or more processors of the robot 180 can generate a global geometry representation 223 and a local geometry representation 225 based on applying the inputs to the geometry network 120. The global geometry representation 223 can be an encoding that is a high-dimensional geometry representation. In some implementations, the encoding can be generated based on processing of the static image 291A or the pre-grasp image 291B (and optionally a corresponding vision sensor pose 292A or 292B) utilizing one or more trained neural network models of the geometry network 120. The local geometry representation 225 can be geometry-aware and locally focused on an area that is near a candidate grasp pose 293. The local geometry representation 225 can be generated based on processing of the global geometry representation 223 and/or the static image 291A (or the pre-grasp image 291B) in view of the candidate grasp pose 293. The candidate grasp pose 293 can be a candidate end effector pose being considered for grasping, and can be generated by one or more other components.

In some implementations, the candidate grasp pose 293 is generated by sampling a group of candidate end effector poses and selecting the candidate grasp pose 293 from the sampled group. In some of those implementations, the candidate grasp pose 293 is generated using an optimization technique, such a derivative-free optimization algorithm. For example, a derivative free-optimization technique, such as a cross-entropy method (CEM) can be utilized in the selection. CEM is a derivative-free optimization algorithm that samples a batch of N values at each iteration, fits a Gaussian distribution to N<M of these samples, and then samples a new batch of N from this Gaussian. For instance, the CEM and values of M=64 and N=6 can be utilized, and three iterations of CEM performed to determine a best available (according to the CEM) candidate grasp pose 293. The optimization can be in view of, for example, the grasp outcome prediction network (e.g., the grasp outcome prediction network can be utilized to evaluate which of the sampled values (candidate end effector poses) is "best" at each iteration. For example, in generating a candidate grasp pose 293, multiple candidate end effector poses can be considered in view of the optimization technique, and the best (according to the optimization technique) sampled candidate grasp pose can be selected. The best sampled candidate grasp pose can be the one that yields the best grasp outcome prediction in view of processing using the grasp outcome prediction network. In some other implementations, a separate upstream trained neural network model may be utilized in determining the candidate grasp pose 293.

The local geometry representation 225, the global geometry representation 223, the candidate grasp pose 293, the pre-grasp image 291B, and optionally the pre-grasp vision sensor pose 292B are applied (or provided) as one or more inputs to the grasp outcome prediction network 140. A grasp outcome prediction 247 is generated over the grasp outcome prediction network 140 based on applying the one or more inputs. For example, one or more processors of the robot 180 can apply the inputs and generate the grasp outcome prediction 247. The grasp outcome prediction 247 can be a measure that indicates a likelihood of successful grasp of an object if a grasp of the object is attempted by the end effector 182A when at the candidate grasp pose. In some implementations, if it is determined that the grasp outcome prediction 247 satisfies one or more criteria (e.g., a probability threshold), then control commands can be provided to one or more actuators of the robot to cause the end effector 182A to attempt a grasp of the object at the candidate grasp pose 293 of the end effector 182A. For example, the control commands can cause the end effector 182A to traverse to the candidate grasp pose 293, then attempt a grasp. In some implementations, if it is determined that the grasp outcome prediction 247 does not satisfy one or more criteria (e.g., a probability threshold), then a new candidate grasp pose can be selected and a new grasp outcome prediction determined based on the new candidate grasp pose (and optionally based on new image(s) and/or vision sensor pose(s)).

Figure 3:
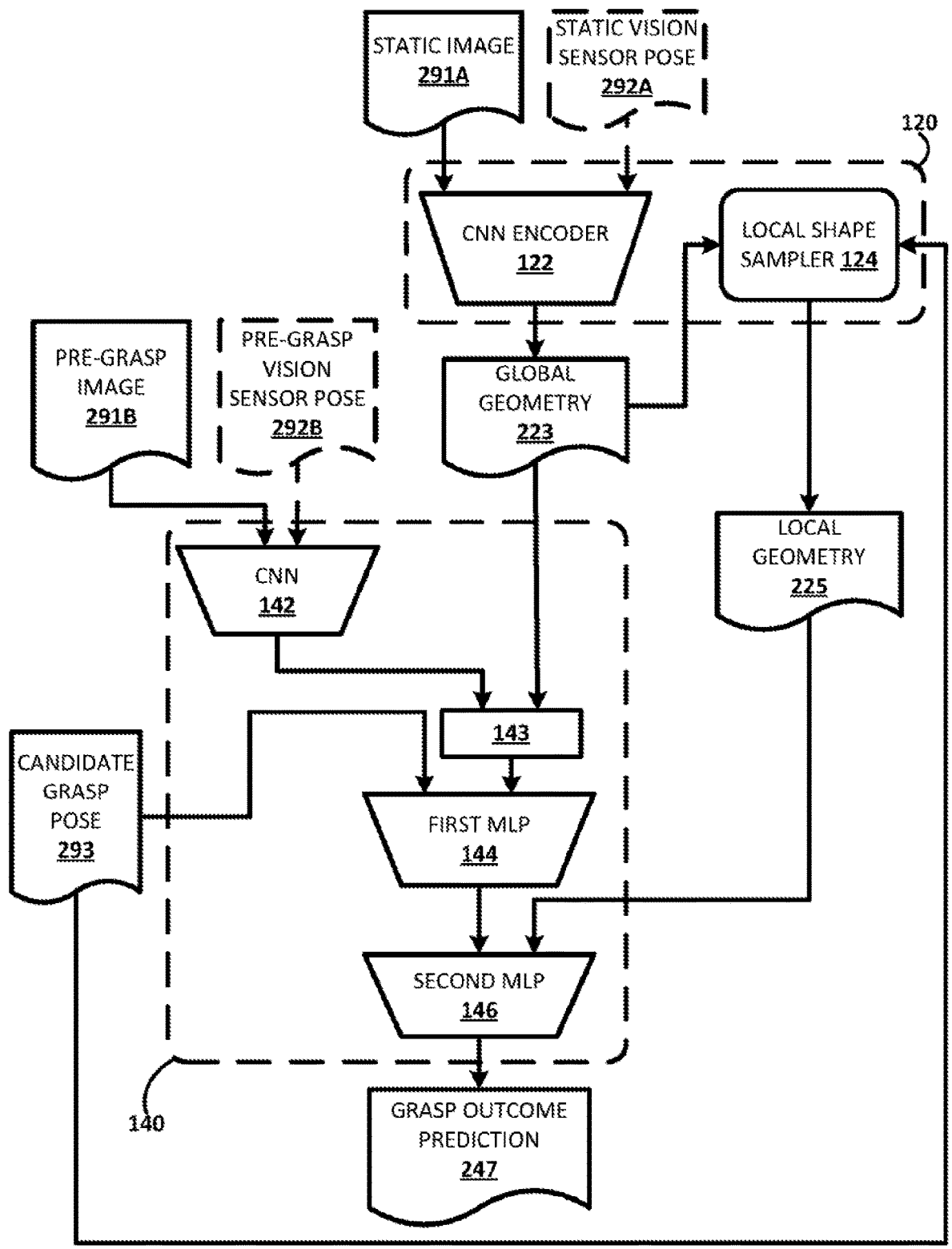
FIG. 3 illustrates a particular implementation of the geometry network and the grasp outcome prediction network of FIG. 2, and examples of how the data of FIG. 2 can be applied to the particular implementation of the networks to generate the grasp outcome prediction of FIG. 2.

FIG. 3 illustrates one implementation of the geometry network and the grasp outcome prediction network of FIG. 2. FIG. 3 is illustrated with the same data 291A, 291B, 292A, 292B, 293 as illustrated in FIG. 2, and is illustrated with the same global geometry representation 223, local geometry representation 225, and grasp outcome prediction 247 as in FIG. 2. However, FIG. 3 is illustrated with components of geometry network 120 and components of grasp outcome prediction network 140 that may be utilized in some implementations. Moreover, FIG. 3 is illustrated with the static image 291A and optionally the static vision sensor pose 292A being applied as input to geometry network 120, and the separate pre-grasp image 291B and optionally the pre-grasp vision sensor pose 292B being applied as input to the grasp outcome prediction network 140.

In FIG. 3, the static image 291A and optionally the static vision sensor pose 292A are applied as input to a trained CNN encoder 122 to generate a global geometry representation 223. The global geometry representation 223 is an encoding that is a high-dimensional geometry representation, and is generated based on processing of the static image 291A, and optionally the static vision sensor pose 292A, using the trained CNN encoder 122. In other words, the global geometry representation 223 is an encoding of the static image 291A and optionally the static vision sensor pose 292A, as generated based on the trained CNN encoder 122. As described herein (e.g., description related to FIGS. 4 and 6), the CNN encoder 122 can be trained so that the global geometry representation 223 generated using the CNN encoder 122 represents 3D features (e.g., 3D shape) of object(s) captured by the static image 291A. In some of those implementations, the global geometry representation 223 is an encoding and is viewpoint invariant (e.g., identity units). Also, in some of those implementations, the global geometry representation 223 is high-dimensional in that it is not a full 3D representation. Rather, it encodes 3D features in an encoding that is a data structure that is much smaller than a data structure required for a full 3D representation.

A local shape sampler 124 of the geometry network 120 is utilized to generate the local geometry representation 225. The local geometry representation 225 is generated based on the global geometry representation 223 and the candidate grasp pose 293 of the end effector. The local shape sampler 124 can generate the local geometry representation 225 based on dense sampling of the global geometry representation 223, from the perspective of (e.g., frame of reference of) the candidate grasp pose 293 of the end effector. In these and other manners, the local geometry representation can represent 3D features of the object from a perspective of the candidate grasp pose 293.

The grasp outcome prediction network 140 includes a CNN 142, a combining layer 143, a first multilayer perception ("MLP") neural network 144, and a second MLP neural network 146. The pre-grasp image 291B is applied as input to the CNN 142, optionally along with the pre-grasp vision sensor pose 292B. Output is generated over the CNN 142 based on applying the pre-grasp image 291B and optionally the pre-grasp vision sensor pose 292B. The output generated over the CNN 142 effectively encodes a current state of the environment of the robot 180, and the output is applied as input to the combining layer 143, along with the global geometry representation 223. Output is generated over the combining layer 143 based on the output generated over the CNN 142 and the global geometry representation. The output from the combining layer 143 and the candidate grasp pose 293 are applied as input to the first MLP 144. Output is generated over the first MLP 144 based on applying the output from the combining layer 143 and the candidate grasp pose 293. Along with the output from the first MLP 144, the local geometry representation 225 is also applied as input to the second MLP 146. The grasp outcome prediction 247 is generated over the second MLP 146 based on applying the output from the first MLP 144 and the local geometry representation 225.

Accordingly, in the implementation of FIG. 3, the grasp outcome prediction network 140 includes multiple stacked trained neural networks 142, 143, 144, and 146, where each includes one or more network layers. The CNN 142 is utilized to effectively encode a current state of the environment of the robot 180 without regard to the candidate grasp pose 293 or the global or local geometry representations 223 and 225. The combining layer 143 is utilized to infuse the global geometry representation 223 with the encoding of the current state. The first MLP 144 is utilized to generate output that is indicative of the grasp outcome prediction in view of the current state encoding of the CNN 142 and the global geometry representation 223 (via application to the first MLP 144 of the output of layer 143), and in view of the candidate grasp pose 293. The second MLP 146 is utilized to generate the final grasp outcome prediction 247 in view of the global geometry influenced output of the first MLP 144, and in view of the local geometry representation 225.

Although a particular robot 180 is illustrated in FIG. 1 and described with respect to various additional figures herein (e.g., FIGS. 2 and 3), additional and/or alternative robots may be utilized, including additional robot arms that are similar to robot 180, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although a particular grasping end effector 182A is illustrated in FIG. 1, additional and/or alternative end effectors may be utilized by the robot 180, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although a particular mounting of vision component 184 is illustrated in FIG. 1, additional and/or alternative mountings may be utilized. For example, in some implementations, a vision component may be mounted directly to robots, such as on non-actuable components of the robots or on actuable components of the robots (e.g., on the end effector or on a component close to the end effector). Also, for example, in some implementations, a vision component may be mounted on a non-stationary structure that is separate from its associated robot and/or may be mounted in a non-stationary manner on a structure that is separate from its associated robot.

Also illustrated in FIG. 1 is a computing device 105. Computing device 105 can be, for example: a virtual reality headset and optional external components; a tablet; a mobile phone; a desktop computing device; etc. A user can interact with one or more user interface input devices of computing device 105 to demonstrate a grasp attempt in a VR environment that is rendered by the computing device 105 and/or that is rendered by one or more additional computing devices in network communication with the computing device 105.

For example, in FIG. 1 a display screen 106 of the computing device is illustrated with a rendered VR environment that includes a representation of glasses 189B, a representation of a surface on which the glasses rest (unnumbered), and a representation of an end effector 182B of a robot. In other implementations, other components of the robot may also be rendered, such as link(s) that control the position of the end effector 182B. Through interaction with user interface input device(s) (e.g., the display screen 106 if it is touch-sensitive, a separate controller), a user can manipulate the pose of the end effector 182B in the VR environment and cause a grasp of the glasses 189B to be attempted when the pose is at a desired pose. In some implementations, a physics engine of the VR environment can be utilized to determine whether the attempted grasp was successful. In some implementations, a successful grasp may be determined if, after actuating the grasping members of the end effector 182B in the virtual reality environment to a closed or "partially closed" state, the at least a portion of the glasses 189B are positioned between the grasping members. Various data from the VR environment and the user's interactions via the environment can be provided to the training instance generation system 110 and utilized in generating a training instance. For example, image(s) generated from the VR environment, the desired pose, and the actual grasp outcome can be utilized by the training instance generation system 110 to generate a training instance.

The training instance generation system 110 includes an image engine 112, a grasp pose engine 114, a grasp outcome engine 116, and a supplemental instances engine 118. In generating a training instance from a user-guided grasp attempt, the image engine 112 determines, for the training instance, one or more static images and/or pre-grasp images based on data from the user-guided grasp attempt. The image engine 112 can also determine corresponding vision sensor poses for the images. The grasp pose engine 114 determines, for the training instance, a grasp pose of the end effector based on the grasp pose utilized in the user-guided grasp attempt. The grasp outcome engine 116 determines, for the training instance, a measure that indicates the grasp outcome of the user-guided grasp attempt. The determined image(s), grasp pose, and grasp outcome for a user-guided grasp attempt can be stored, by the training instance generation system 110, as a training instance in training instances database 170. The supplemental instances engine 118 can automatically generate one or more additional training instances, based on a corresponding user-guided grasp attempt—and can optionally interact with one or more of the other engines 112, 114, and 116 in generating the additional training instance(s). The training instance generation system 110 can store the additional training instances in training instances database 170. Additional description is now provided of each of the engines 112, 114, 116, and 118.

In generating a training instance from a user-guided grasp attempt, the image engine 112 determines, for the training instance, one or more 2D or 2.5D images that are associated with the grasp attempt. When the grasp attempt is via a VR environment, the image engine 112 can generate the image(s). In generating an image from a virtual environment, the image engine 112 can utilize ray tracing and/or other image generation techniques.

As one example, the image engine 112 can generate, for the training instance, one or more static images that each capture the glasses 189B and at least part of the surface on which the glasses 189B rest. In generating a static image, the image engine 112 can generate the static image from a corresponding virtual vision sensor pose, and can store the corresponding static virtual vision sensor pose in association with the static image in the training instance. For example, a static image can be generated from a virtual vision sensor pose that is targeted at or near the glasses 189B of FIG. 1, and that it is at a corresponding distance (e.g., a distance between 35 and 45 centimeters) from the glasses 189B, and at a corresponding azimuth and elevation. In some implementations, one or more of the static images can omit the representation of the end effector 182B. In some implementations, the image engine 112 can generate a plurality of static images for a corresponding grasp attempt, where each of the static images is captured from a virtual camera sensor pose that is unique from virtual camera sensor pose(s) of other static image(s) for the grasp attempt (e.g., at a unique position and/or orientation). For example, a first static image can be captured from a virtual vision sensor pose that is targeted toward the glasses 189B and: has a pseudo-randomly selected position that is within a first distance range of the glasses 189B; and has an elevation and/or azimuth that is selected from a plurality of predefined elevations and/or azimuths.

As another example, the image engine 112 can generate, for the training instance, one or more pre-grasp images that each capture the glasses 189B, and that capture the end-effector 182B. The pre-grasp image can be captured when the end effector 182B is in the grasp pose in some situations, or when the end effector 182B is in a pose that precedes the grasp pose, such a pose that is before the grasp pose and that occurred within at least a threshold temporal duration of the grasp pose. As with a static image, a pre-grasp image can be generated from a virtual vision sensor pose that is targeted at or near the glasses 189B of FIG. 1, and that is at a corresponding distance from the glasses 189B, and at a corresponding azimuth and elevation. The corresponding pre-grasp virtual sensor pose can be stored in association with the pre-grasp image in the training instance.

Where the user-guided grasp attempt is via physical manipulation of the robot 180, the image engine 112 can determine images for the training instance based on images captured by the vision component 184. For example, the image engine 112 can utilize image(s) that omit the end effector 182A as static images, and an image captured by vision component 184 temporally close to the grasp attempt as a pre-grasp image. Corresponding poses of the vision component 184 can be stored in association with the static and pre-grasp images. The pose of the vision component 184 for a given image can be determined, for example, by the robot 180 utilizing one or more localization techniques.

The grasp pose engine 114 determines, for the training instance, a grasp pose of the end effector based on the grasp pose utilized in the user-guided grasp attempt. For example, for a VR based user-guided grasp attempt, the grasp pose can be determined based on a virtual pose of the end effector 182B in the virtual environment when the grasp was attempted. For a user-guided grasp attempt that is via physical manipulation of the robot 180, the grasp pose can be determined based on a pose of the end effector 182A when the grasp was attempted. Such a grasp pose can be determined, for example, by the robot 180 utilizing one or more sensors of the robot (e.g., based on applying sensor data to a dynamic model of the robot 180).

The grasp outcome engine 116 determines, for the training instance, a measure that indicates the grasp outcome of the user-guided grasp attempt. In some implementations, the measure that indicates the grasp outcome is a binary label, such as a "0/successful" or "1/not successful" label. In some implementations, the measure that indicates the grasp outcome may be selected from more than two options, such as 0, 1, and one or more values between 0 and 1. For example, "0" may indicate a confirmed "not successful grasp", "1" may indicate a confirmed successful grasp, "0.25" may indicate a "most likely not successful grasp" and "0.75" may indicate a "most likely successful grasp."

As one example, for a VR based user-guided grasp attempt, the grasp outcome engine 116 can determine a measure that indicates a successful grasp outcome if, after actuating the grasping members of the end effector 182E3 in the virtual reality environment to a closed or "partially closed" state, at least a portion of the glasses 189E3 are positioned between the grasping members.

As another example, for a user-guided grasp attempt that is via physical manipulation of the robot 180, the grasp outcome engine 116 can determine success of a grasp based on various sensor data from the robot 180. For example, the sensor data may include a position reading, a torque reading, and/or other reading from the grasping end effector 182A. In such an example, the grasp outcome engine 116 may determine a grasp success label based on the reading(s). For example, where the reading is a position reading, the grasp outcome engine 116 may determine a "successful grasp" label if the reading is greater than some threshold (e.g., 1 cm)—and may determine an "unsuccessful grasp" label if the reading is less than some threshold (e.g., 1 cm). As another example, the sensor data may include an image of the end effector grasping an object grasped in the grasp attempt. For example, the image may be captured by vision component 184 after the end effector 182A and any object that may be grasped by the end effector are moved to a position close to the vision component 184. In such an example, the grasp outcome engine 116 may utilize the captured image to determine if the grasp attempt was successful. For example, the grasp outcome engine 116 may provide the captured image to computing devices of one or more human reviewers who may utilize their computing devices to indicate, based on the captured image, whether the grasp was successful.

The supplemental instances engine 118 can automatically generate one or more additional training instances, based on a corresponding user-guided grasp attempt (virtual or physical)—and can interact with one or more of the other engines 112, 114, and 116 in generating the additional training instance(s). The training instance generation system 110 can store the additional training instances in training instances database 170. For example, in generating an additional training instance, the supplemental instances engine 118 can determine a new grasp pose based on a grasp pose from a user-guided grasp attempt. For instance, a new grasp pose can be selected that is within a desired variance (e.g., +/−X centimeters for position and/or +/−X degrees for orientation) of the grasp pose from the user-guided grasp attempt. Further, the object and the scene from the user-guided grasp attempt can be utilized (e.g., the same object pose can be utilized), and a new grasp attempt can be attempted (in the VR environment or physical environment) utilizing the new grasp pose. Various techniques, such as those described herein, can be utilized to determine whether the new attempted grasp was successful. Various data from the new grasp attempt can be utilized in generating the additional training instance. For example, the new grasp pose and the new grasp outcome can be utilized to generate the additional training instance. Image(s) from the new grasp attempt and/or from the user-guided attempt can further be included in the additional training instance (e.g., static image(s) from the user-guided attempt can be reused, and a new pre-grasp image determined based on the additional training instance).

Although FIG. 1 is illustrated with particular objects 189A and 189B, in many implementations training instances are generated based on user-guided grasp attempts in association with a variety of disparate objects (physical or virtual) and/or across a variety of scenes. For example, for virtual user-guided grasp attempts one or more users can utilize corresponding computing devices to attempt virtual grasps of a cup resting on a first surface, one or more users can utilize corresponding computing devices to attempt virtual grasps of a bowl resting on a second surface, one or more users can utilize corresponding computing devices to attempt virtual grasps of a stapler resting on a third surface, etc. Such variety of target objects and/or scenes may lead to more diverse training instances, which may lead to improved performance of networks 120 and/or 140 that are trained based on such training instances.

Training engine 130 utilizes training instances of training instances database 170 in training neural network model(s) of the geometry network 120 and/or in training neural network model(s) of the grasp outcome prediction network. The training engine 130 can include one or more GPU(s), TPU(s), and/or CPU(s).

Figure 4:
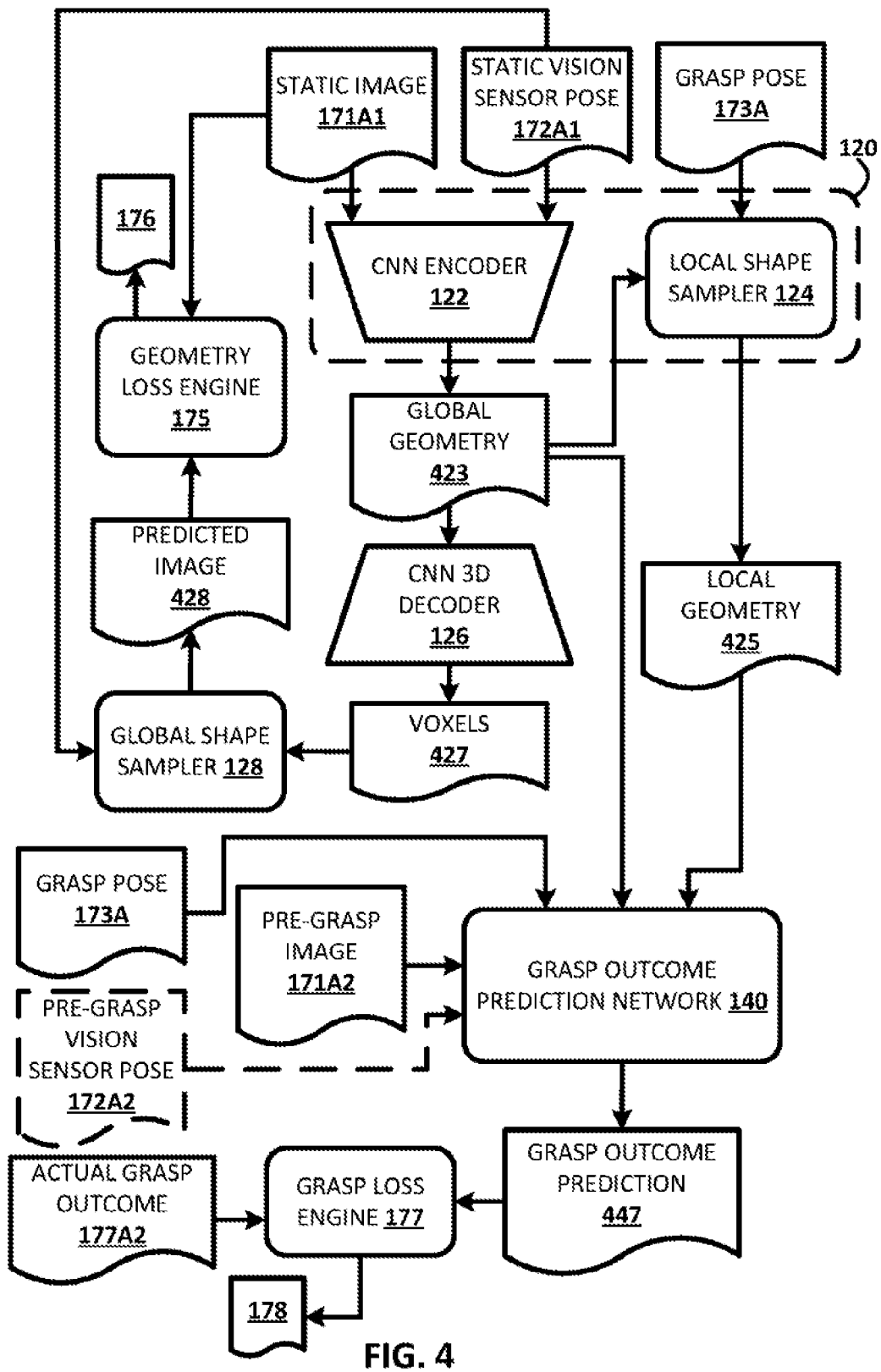
FIG. 4 illustrates an example of how the geometry network and the grasp outcome prediction network can be trained.

Referring to FIG. 4, an example is provided of how the geometry network 120 and the grasp outcome prediction network 140 can be trained. Although the training engine 130 is not illustrated in FIG. 4, the training engine 130 can perform the example training of FIG. 4. For example, the training engine 130 can apply the training instances in FIG. 4, generate the loss(es) in FIG. 4, and update various neural networks in FIG. 4 based on the loss(es). In FIG. 4, a single training instance is illustrated and description below is provided with respect to the single training instance for sake of simplicity. However, it is understood that training of the various neural networks in FIG. 4 will be based on a large number (e.g., tens of thousands or more) of training instances, and updating of such neural networks based on the training instances.

In FIG. 4, the geometry network 120 of the example of FIG. 3 is illustrated. Further, in FIG. 4 a CNN 3D decoder 126, a global shape sampler, a geometry loss engine 175, and a grasp loss engine 177 are illustrated. Loss engines 175 and 177 can be components of the training engine 130 in some implementations.

In FIG. 4, a static image 171A1 and a static vision sensor pose 172A1 are applied as input to the CNN encoder 122. The static image 171A1 and the static vision sensor pose 172A1 are both of a training instance from training instances database 170. A global geometry representation 423 is generated using the CNN encoder 122 based on the applied static image 171A1 and static vision sensor pose 172A1. The global geometry representation 423 is an encoding. For example, the encoding can be a 1×1×512 matrix of values.

The global geometry representation 423 is applied as input to a CNN 3D decoder 126, which can be a deconvolutional neural network. A decoding of the global geometry representation 423 is generated using the CNN 3D decoder 126 and is in the form of a 3D voxels representation 427. For example, the voxels representation 427 can be a 32×32×32 (or other dimension) matrix of values, where each of the values indicates characteristic(s) of a corresponding voxel (e.g., occupied/unoccupied). The voxels representation 427 is provided to the global shape sampler 128, which transforms the voxels representation 427 into a predicted image 428 that is at the same resolution as the static image 171A1. The global shape sampler 128 transforms the voxels into the predicted image 428 utilizing the static vision sensor pose 172A1, such that the predicted image 428 is a predicted image from the same pose as the static vision sensor pose 172A1.

The geometry loss engine 175 generates a loss 176 based on comparison of the predicted image 428 and the static image 171A1. Accordingly, the generated loss 176 is a function of the differences between the predicted image 428 and the static image 171A1. In some implementations, the generated loss 176 is a function of the differences in depth dimensions of the two images 428, 171A1, and optionally of the differences in an "object mask" difference between the two images 428, 171A1. The "object mask" of an image can be a 2D silhouette of objects captured in the image. The loss 176 is utilized to update the CNN 3D decoder 126 and/or the CNN encoder 122. For example, the loss may be backpropagated through both the CNN 3D decoder 126 and the CNN encoder 122.

Accordingly, through generation of the loss 176 as described above, the CNN encoder 122 is updated to encourage generation, based on 2D or 2.5D images, of encodings that represent rich geometric features of object(s) in the images—as the encoding 423 is being applied to the CNN 3D encoder 126 to generate a 3D representation in the form of voxels, and the accuracy of the generated 3D representation is being determined indirectly as a function of the loss 176 through generation of predicted image 428 and comparison of the predicted image 428 to the static image 171A1.

Notably, the CNN 3D decoder 126 and the global shape sampler 128 are utilized in FIG. 4 in training of the CNN encoder 122. However, in many implementations they are not utilized at an inference stage, as evidenced by the example of FIG. 3. In other words, their utilization in training can enable training of the CNN encoder 122 so that it can be utilized to generate geometry-aware encodings of images. As described herein, those encodings can then be applied as direct input to the grasp outcome prediction network 140—and the grasp income prediction network 140 can be utilized to determine grasp outcome predictions based on such encodings. Accordingly, in those implementations the grasp outcome prediction network 140 can accept, and generate output based on, higher-dimensional encodings of geometry features—in lieu of a lower-dimensional (and more computationally burdensome) full 3D representation.

In FIG. 4, the local shape sampler 124 utilizes the global geometry representation 423, and the grasp pose 173A of the training instance to generate a local geometry representation 425.

The global geometry representation 423, the local geometry representation 425, and the grasp pose 173A are applied as input to the grasp outcome prediction network 140. Further, a pre-grasp image 171A2 and optionally a pre-grasp vision sensor pose 172A2 of the training instance are also applied as input to the grasp outcome prediction network 140. As described herein (e.g., FIG. 3), in some implementations the grasp outcome prediction network 140 may include a plurality of separate neural networks (each comprising a plurality of layers) and the inputs may each be applied to corresponding one(s) of the neural networks. For example, the pre-grasp image 171A2 and a pre-grasp vision sensor pose 172A2 can be applied as input to CNN 142 (FIG. 3), output from CNN 142 and the global geometry 423 applied to combining layer 143, the output from the combining layer 143 (FIG. 3) and the grasp pose 473A applied as input to first MLP 144 (FIG. 3), and output from first MLP 144 and the local geometry 425 applied as input to the second MLP 144 (FIG. 3).

A grasp outcome prediction 447 is generated using the grasp outcome prediction network 140 based on the applied input.

The grasp loss engine 177 generates a loss 178 based on comparison of the grasp outcome prediction 447 to an actual grasp outcome 177A2 of the training instance. Accordingly, the generated loss 178 is a function of the difference between the grasp outcome prediction 447 and the actual grasp outcome 177A2. The loss 178 is utilized to update the grasp outcome prediction network 140. For example, the loss may be backpropagated through grasp outcome prediction network 140. In some implementations, the loss 178 may also be utilized to update the CNN encoder 122 and/or the CNN 3D decoder 126.

FIG. 4 illustrates an example of training both the CNN encoder 122 and the grasp outcome prediction network 140 based on a training instance. However, in some implementations, the CNN encoder 122 may be at least "pre-trained" independent of any training of the grasp outcome prediction network 140. For example, the CNN encoder 122 may be pre-trained utilizing static images and static camera poses from training instances, and utilizing CNN 3D decoder 126, global shape sampler 128, and geometry loss engine 175 as described above. Thereafter, the grasp outcome prediction network 140 may be trained in conjunction with the CNN encoder 122 (e.g., utilizing global geometry representations generated by the CNN encoder 122 based on training instances). In some of those implementations, CNN encoder 122 may continue to be updated during such subsequent training. For example CNN encoder 122 may continue to be updated based on losses generated by grasp loss engine 177 and/or losses generated based on geometry loss engine 175 (if engine 175 and/or CNN 3D decoder 126 and global shape sampler 128 are utilized in such subsequent training). Also, FIG. 4 illustrates an example of a single static image 171A1 and a loss 176 determined based on the single static image 171A1. However, in many implementations, multiple static images from a scene (e.g., each captured from a different vision sensor pose) can be utilized, predicted images for each determined, and the loss 176 can be a multi-loss that is based on differences between all of the predicted images and their corresponding static images.

In some implementations, in transforming the voxels representation 427 into a predicted image 428, the global shape sampler 128 performs a projective operation that transforms the voxels representation 427 into a 2.5D image (2D with depth map), with a vision sensor transformation matrix that is based on the static vision sensor pose 172A1. This can include: performing a dense sampling from the voxels representation 427 (in 3D world frame) to an output volume (in normalized coordinates); and flattening the 3D spatial output across one dimension. Each 3D point from the voxels representation 427 and each corresponding point in the output volume can be related, by the global shape sampler 128, using the vision sensor transformation matrix.

Turning now to FIGS. 5-8, additional description is provided of various methods described herein.

Figure 5:
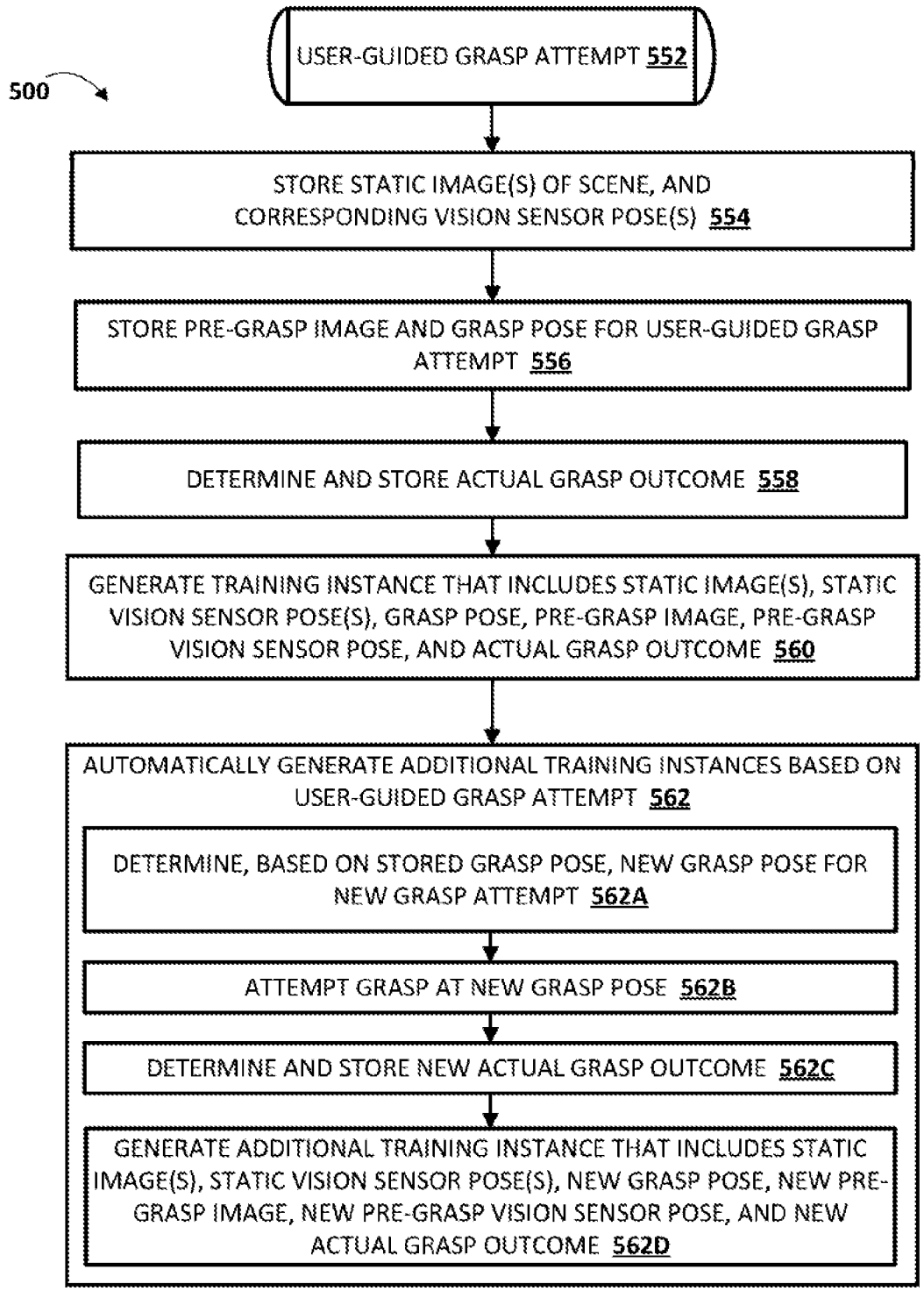
FIG. 5 is a flowchart illustrating an example method of generating training instances based on a user-guided grasp attempt.

FIG. 5 is a flowchart illustrating an example method 500 of generating training instances based on a user-guided grasp attempt. For convenience, the operations of the flow chart are described with reference to a system that performs the operations. This system may include one or more components of one or more computing systems, such as computing device 105 and/or training instance generation system 110. Moreover, while operations of method 500 are shown in a particular order, this is not meant to be limiting. One or more operations may be reordered, omitted or added.

At block 552, a user-guided grasp attempt starts.

At block 554, the system stores one or more static images of the scene, and corresponding vision sensor pose(s). For example, where the user-guided grasp attempt is via a VR environment, the system can render one or more static images, with each being rendered from a virtual vision sensor pose that is targeted at or near a target object of the grasp attempt, and that it is at a corresponding distance from the target object and at a corresponding azimuth and elevation. In some implementations, one or more of the static images can omit any robotic end effector.

At block 556, the system stores a grasp pose for the user-guided grasp attempt. For example, for a VR based user-guided grasp attempt, the system can determine the grasp pose based on a virtual pose of the end effector in the virtual environment when the grasp was attempted.

At block 558, the system determines and stores an actual grasp outcome of the user-guided grasp attempt, such as a measure that indicates the actual grasp outcome. As one example, for a VR based user-guided grasp attempt, the system can determine a measure that indicates a successful grasp outcome if, after actuating the grasping members of the end effector in the virtual reality environment to a closed or "partially closed" state, at least a portion of the target object is positioned between the grasping members At block 560, the system generates a training instance that includes: static image(s) and corresponding static vision sensor pose(s) stored at block 554, the grasp pose stored at block 556, a pre-grasp image captured prior to the grasp attempt, optionally a pre-grasp vision sensor pose for the pre-grasp image, and the actual grasp outcome of block 558. The pre-grasp image and the optional pre-grasp vision sensor pose capture the target object and the end effector. The pre-grasp image can be captured when the end effector is in the grasp pose in some situations, or when the end effector is in a pose that precedes the grasp pose, such a pose that is before the grasp pose and that occurred within at least a threshold temporal duration of the grasp pose.

At block 562, the system automatically generates additional training instances based on the user-guided grasp attempt. In some implementations, in generating an additional training instance based on a user-guided grasp attempt, the system performs sub-blocks 562A-D.

At block 562A, the system determines, based on the stored grasp pose of the user-guided grasp attempt (the grasp pose of block 556), a new grasp pose for the grasp attempt. For example, the system can determine a new grasp pose based on it being within a desired variance of the grasp pose from the user-guided grasp attempt. For instance, the system can determine the new grasp pose based on pseudo-random selection of the new grasp pose from a normal distribution of poses having a mean of the stored grasp pose and a desired variance (e.g., 5 cm as a standard deviation for position and 20 degree as a standard deviation for orientation).

At block 562B, the system attempts a grasp at the new grasp pose.

At block 562C, the system determines and stores a new actual grasp outcome, such as a measure that indicates the new actual grasp outcome.

At block 562D, the system generates an additional training instance that includes: static images (e.g., those of block 554 and/or additional static image(s)) and corresponding static vision sensor pose(s), the new grasp pose of block 562A, a new pre-grasp image and optional new pre-grasp vision sensor pose, and the new actual grasp outcome of block 562C. The new pre-grasp image can be captured when the end effector is in the new grasp pose in some situations, or when the end effector is in a pose that precedes the new grasp pose.

Figure 6:
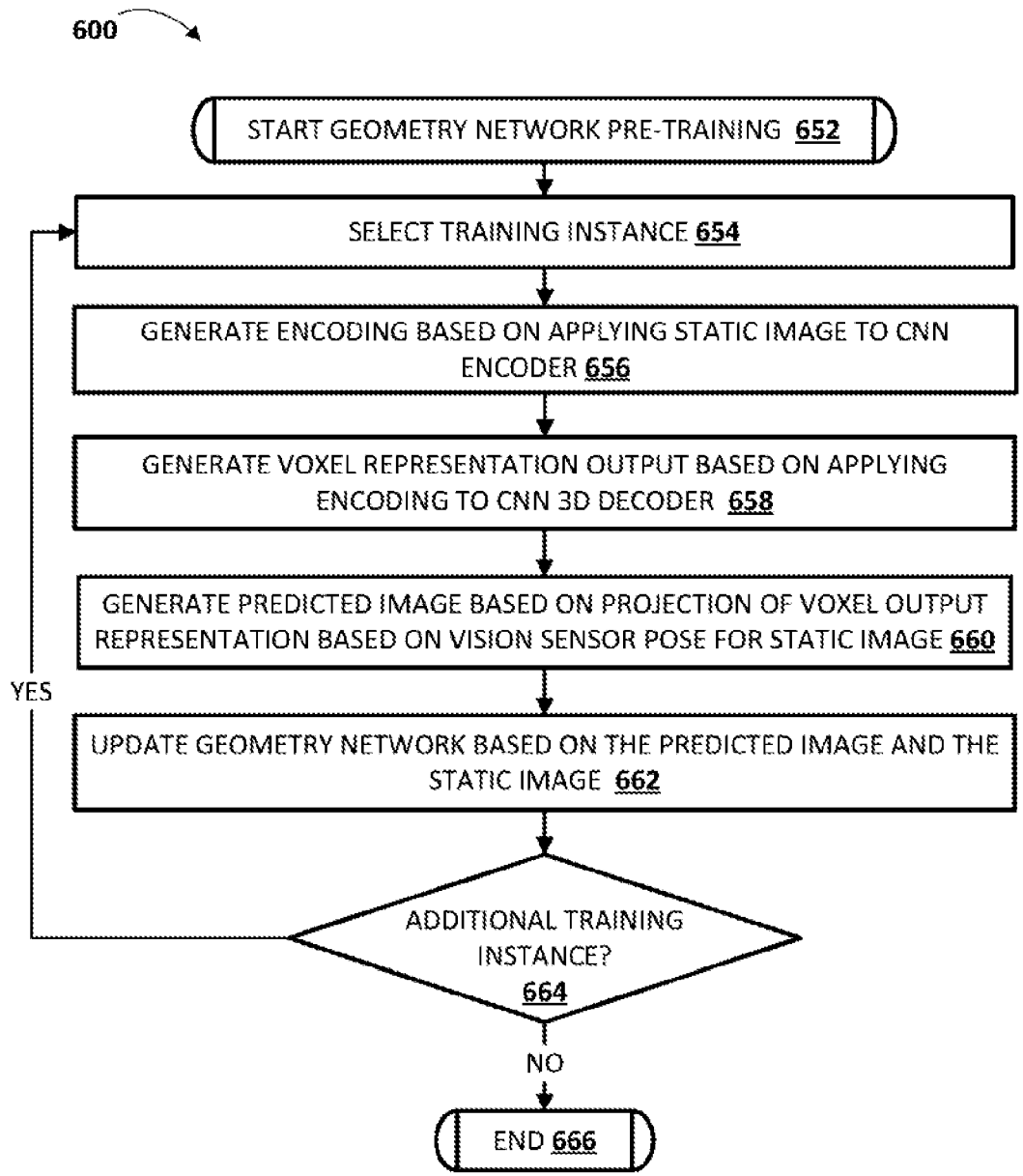
FIG. 6 is a flowchart illustrating an example method of pre-training a geometry network based on training instances.

FIG. 6 is a flowchart illustrating an example method 600 of pre-training a geometry network based on training instances. For convenience, the operations of the flow chart are described with reference to a system that performs the operations. This system may include one or more components of one or more computing systems, such as training engine 130. Moreover, while operations of method 600 are shown in a particular order, this is not meant to be limiting. One or more operations may be reordered, omitted or added.

At block 654, the system selects a training instance.

At block 656, the system generates an encoding based on applying a static image of the training instance to a CNN encoder of the geometry network.

At block 658, the system generates a voxel representation output based on applying the encoding to a CNN 3D decoder.

At block 660, the system generates a predicted image based on a projection of the voxel output representation based on a vision sensor pose for the static image of the training instance.

At block 662, the system updates the geometry network based on the predicted image and the static image. For example, the system can generate a loss based on comparison of the predicted image and the static image, and backpropogate the loss though the CNN encoder and/or the CNN 3D decoder. In some implementations, the system generates a loss that is a function of the differences in depth dimensions the predicted image and the static image, and optionally of the differences in an "object mask" difference between the two images.

At block 664, the system determines if an additional training instance should be processed. If so, the system proceeds to block 654 and selects an additional training instance. If not, the system proceeds to block 666 and geometry network pre-training ends. In some implementations, determining if an additional training instance should be processed can include: determining if additional unprocessed training instances are available and/or if one or more training criteria have been satisfied (e.g., a number of epochs criterion, a training duration criterion).

Figure 7:
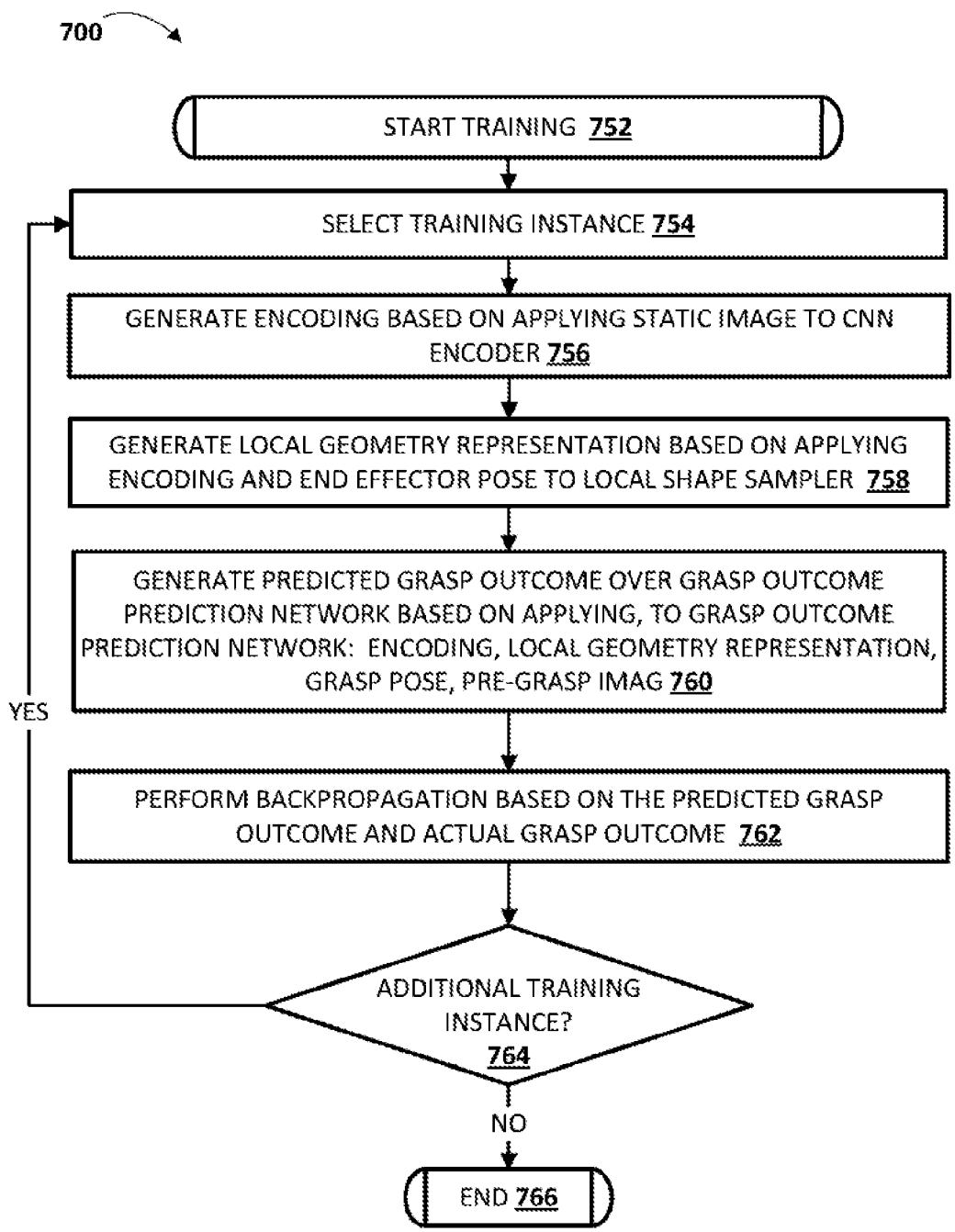
FIG. 7 is a flow chart illustrating an example method of training a grasp outcome prediction network, and optionally a geometry network, based on training instances.

FIG. 7 is a flow chart illustrating an example method 700 of training a grasp outcome prediction network, and optionally a geometry network, based on training instances. For convenience, the operations of the flow chart are described with reference to a system that performs the operations. This system may include one or more components of one or more computing systems, such as training engine 130. Moreover, while operations of method 700 are shown in a particular order, this is not meant to be limiting. One or more operations may be reordered, omitted or added.

At block 752, the system starts the training.

At block 754, the system selects a training instance.

At block 756, the system generates an encoding based on applying a static image of the training instance to a CNN encoder of a geometry network.

At block 758, the system generates a local geometry representation based on applying the encoding and the end effector pose to a local shape sampler.

At block 760, the system generates a predicted grasp outcome using the grasp outcome prediction network based on applying, to the grasp outcome prediction network: the encoding of block 756; the local geometry representation of block 758; and a grasp pose, pre-grasp image, and optionally a pre-grasp vision sensor pose of the training instance.

At block 762, the system performs backpropagation based on the predicted grasp outcome of block 760, and an actual grasp outcome of the training instance. For example, the system can generate a loss based on comparison of the grasp outcome prediction to an actual grasp outcome, and backpropagate the loss through the grasp outcome prediction network 140, and optionally through the CNN encoder 122.

Figure 8:
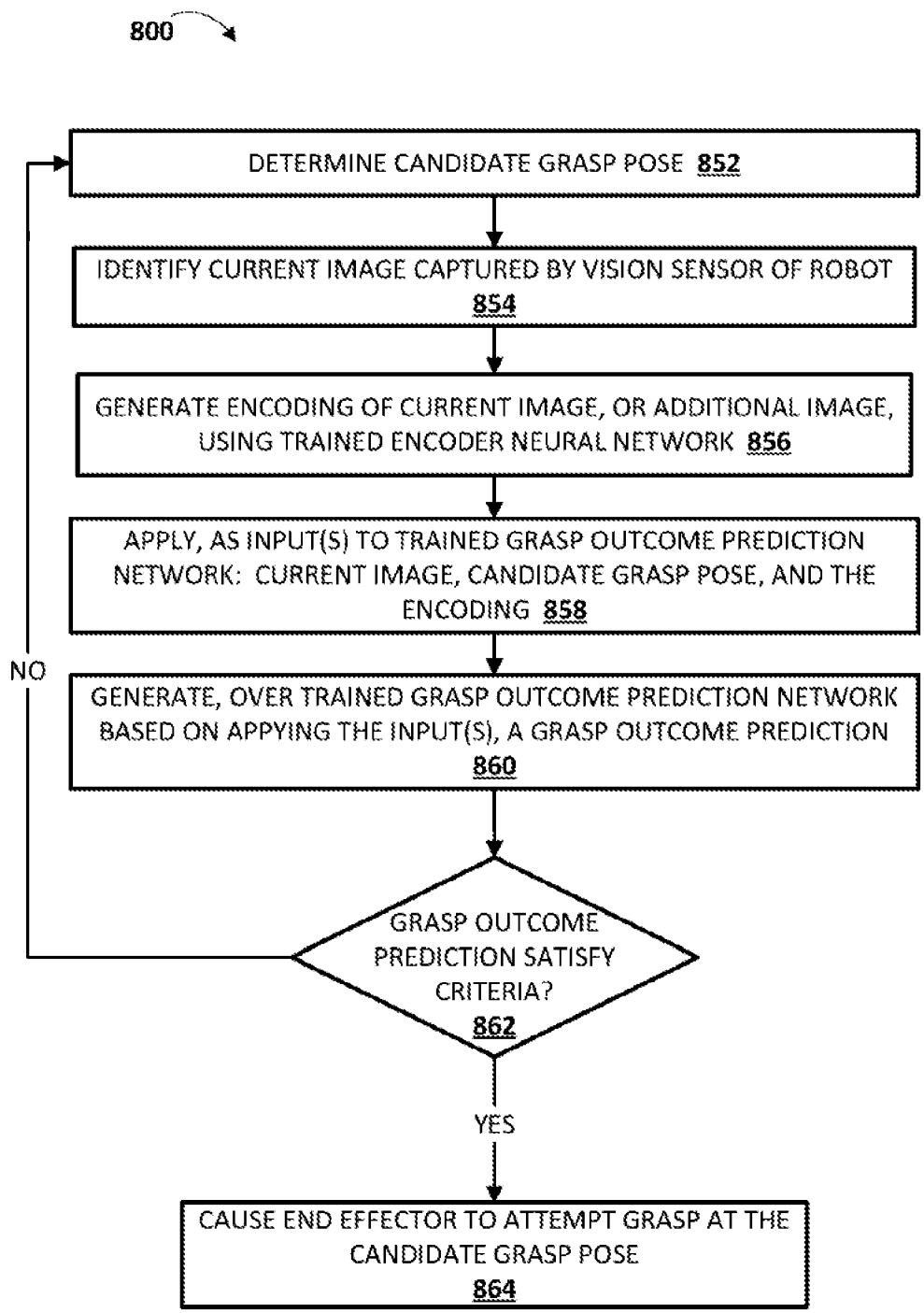
FIG. 8 illustrates an example method of utilizing a geometry network and grasp outcome prediction network to determine when to attempt a grasp based on a candidate grasp pose.

FIG. 8 illustrates an example method of utilizing a geometry network and grasp outcome prediction network to determine when to attempt a grasp based on a candidate grasp pose. For convenience, the operations of the flow chart are described with reference to a system that performs the operations. This system may include one or more processors of a robot, such as one or more processors and/or a robot control system of robot 180, robot 925, and/or other robot. In implementing one or more blocks of method 800, the system may operate using trained neural network models which may, for example, be stored locally at a robot and/or may be stored remote from the robot. Moreover, while operations of method 800 are shown in a particular order, this is not meant to be limiting. One or more operations may be reordered, omitted or added.

At block 852, the system determines a candidate grasp pose for an end effector of a robot. For example, the system can determine a candidate grasp pose using an optimization technique, such as CEM and/or other optimization technique.

At block 854, the system identifies a current image captured by a vision sensor of the robot. The current image can be the most recently captured image, or an image captured within a threshold temporal threshold of a current time.

At block 856, the system generates an encoding of the current image, or an additional image, using a trained encoder neural network. When the encoding is of the additional image, the additional image can be one captured earlier in time than the current image, and may optionally omit the end effector of the robot or include the end effector in a pose where it does not occlude the object in the additional image. In generating the encoding using the trained encoder neural network, the vision sensor pose for the corresponding image can also optionally be utilized.

At block 858, the system applies, as one or more inputs to a trained grasp outcome prediction network: the current image of block 854, the candidate grasp pose of block 852, and the encoding of block 856. In some implementations, the system also applies, to the trained grasp outcome prediction network, a local geometry representation, such as a local geometry representation generated based on dense sampling of the encoding of block 856 from a perspective of the candidate grasp pose.

At block 860, the system generates, using the trained grasp outcome prediction network based on applying the one or more inputs, a grasp outcome prediction.

At block 862, the system determines if the grasp outcome prediction generated at block 860 satisfies one or more criteria (e.g., a threshold). If so, the system proceeds to block 864 and causes the end effector to attempt a grasp at the candidate grasp pose. For example, the system can provide one or more control commands to actuators of the robot to cause the end effector to move to the candidate grasp pose (if it is not already in the candidate grasp pose), and attempt a grasp (e.g., close one or more actuable members) at the candidate grasp pose.

If not, the system proceeds back to block 852 and determines an additional candidate grasp pose. The system can then perform another iteration of blocks 858, 860, and 862 using the additional candidate grasp pose (the system can reuse the encoding from the prior iteration, or generate a new one (e.g., if the scene has changed)).

In some implementations, multiple iterations of one or more blocks of FIG. 8 may be performed in parallel. For example, in some implementations, multiple candidate grasp poses can be considered in parallel (e.g., through multiple iterations of blocks 858 and 860 using the same encoding), and block 862 can include determining if any of the multiple candidates satisfy one or more criteria. In some implementations, multiple iterations of blocks 852, 854, 856, 858, and 860 may be utilized in sampling (according to an optimization technique) a plurality of candidate end effector poses at a given iteration. In some of those implementations, the sampled candidate end effector pose having the best grasp outcome prediction at block 860, from those sampled, can be selected as the determined grasp pose to be implemented. Accordingly, in some versions of those implementations, multiple candidate grasp poses can be sampled at each iteration according to an optimization technique, and only the best (according to the optimization technique) sampled candidate grasp pose can be selected for actual implementation (e.g. used in controlling the end effector) at the iteration. In these and other manners, multiple candidate grasp poses are sampled/considered at each iteration, but only one candidate grasp pose is selected and implemented at each iteration.

Figure 9:
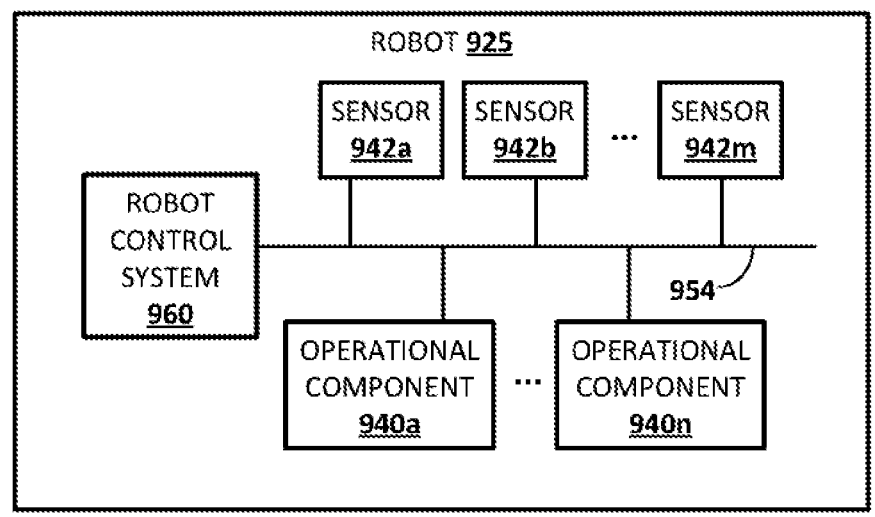
FIG. 9 schematically depicts an example architecture of a robot.

FIG. 9 schematically depicts an example architecture of a robot 925. The robot 925 includes a robot control system 960, one or more operational components 925*a*-925*n*, and one or more sensors 942*a*-942*m*. The sensors 942*a*-942*m* may include, for example, vision sensors, light sensors, pressure sensors, pressure wave sensors (e.g., microphones), proximity sensors, accelerometers, gyroscopes, thermometers, barometers, and so forth. While sensors 942*a*-*m* are depicted as being integral with robot 925, this is not meant to be limiting. In some implementations, sensors 942*a*-*m* may be located external to robot 925, e.g., as standalone units.

Operational components 925*a*-925*n* may include, for example, one or more end effectors and/or one or more servo motors or other actuators to effectuate movement of one or more components of the robot. For example, the robot 925 may have multiple degrees of freedom and each of the actuators may control actuation of the robot 925 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 960 may be implemented in one or more processors, such as a CPU, GPU, and/or other controller(s) of the robot 925. In some implementations, the robot 925 may comprise a "brain box" that may include all or aspects of the control system 960. For example, the brain box may provide real time bursts of data to the operational components 925*a*-*n*, with each of the real time bursts comprising a set of one or more control commands that dictate, inter alio, the parameters of motion (if any) for each of one or more of the operational components 925*a*-*n*. In some implementations, the robot control system 960 may perform one or more aspects of method 800 described herein.

As described herein, in some implementations all or aspects of the control commands generated by control system 960 in positioning an end effector to grasp an object may be based on end effector commands generated based on grasp outcome prediction(s) generated using a trained grasp outcome prediction network. For example, a vision sensor of the sensors 942*a*-*m* may capture a current image and a static image (that is prior to the current image), and the robot control system 960 may generate a candidate grasp pose. The robot control system 960 may generate an encoding based on applying the static image and corresponding static vision sensor pose as input to a trained CNN encoder as described herein. Further, the robot control system 960 can apply the encoding, the candidate grasp pose, and the current image and corresponding current vision sensor pose as input(s) to a trained grasp outcome prediction network to determine a grasp success measure utilizing the candidate grasp pose. If the grasp success measure satisfies a threshold and/or other criterion, the control system 960 can provide control commands to cause the end effector of the robot to attempt a grasp at the candidate grasp pose. Although control system 960 is illustrated in FIG. 9 as an integral part of the robot 925, in some implementations, all or aspects of the control system 960 may be implemented in a component that is separate from, but in communication with, robot 925. For example, all or aspects of control system 960 may be implemented on one or more computing devices that are in wired and/or wireless communication with the robot 925, such as computing device 1010.

Figure 10:
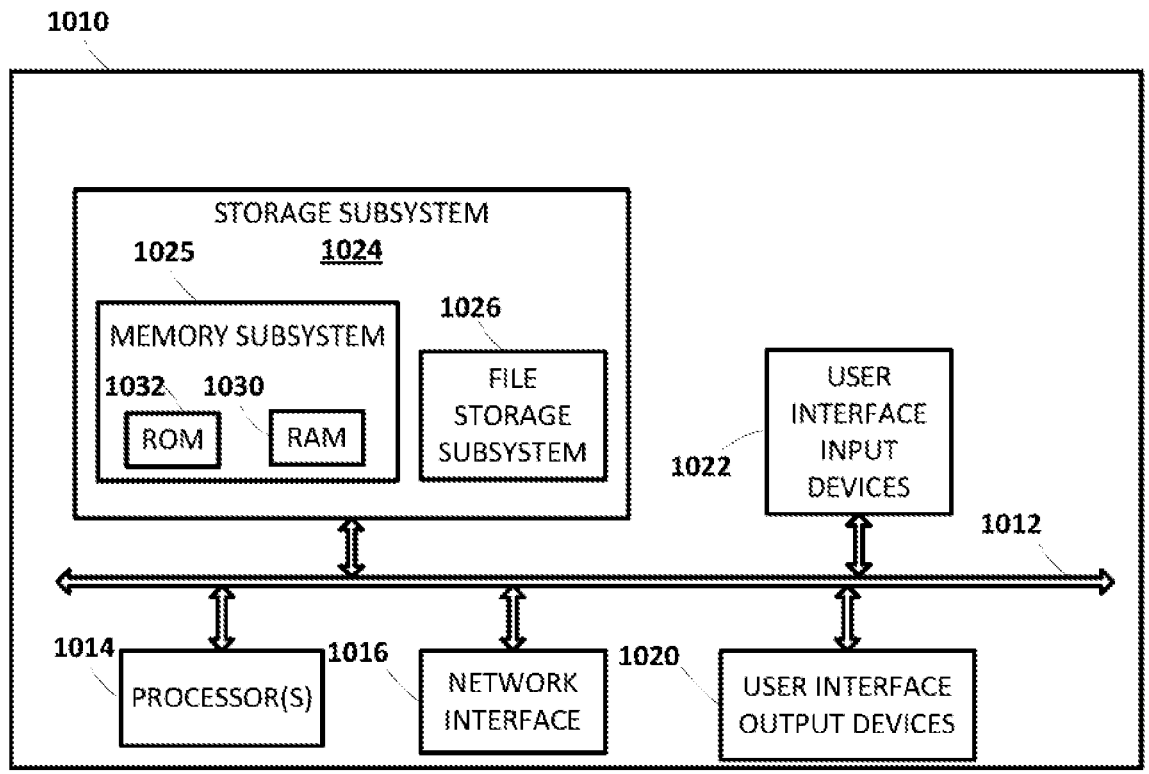
FIG. 10 schematically depicts an example architecture of a computer system.

FIG. 10 is a block diagram of an example computing device 1010 that may optionally be utilized to perform one or more aspects of techniques described herein. For example, in some implementations computing device 1010 may be utilized in training of various neural network models, in generating training instances, and/or in rendering a VR environment. Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIGS. 5, 6, 7, and/or 8.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   identifying a current image captured by a vision sensor of a robot, the current image capturing an end effector of the robot and an object to be grasped by the robot using the end effector;
   determining a candidate grasp pose of the end effector;
   generating an encoding of: the current image, or an additional image that captures the object; wherein generating the encoding comprises processing the current image or the additional image using a trained neural network encoder, and wherein the generated encoding encodes geometry features of the object;
   applying, as one or more inputs to a grasp outcome prediction network: the current image, the candidate grasp pose, and the encoding, wherein the grasping outcome prediction network is a trained neural network model;
   generating, using the grasp outcome prediction network based on the one or more inputs, a grasp outcome prediction;
   determining that the grasp outcome prediction satisfies one or more criteria; and in response to the grasp outcome prediction satisfying the one or more criteria, providing control commands to one or more actuators of the robot to cause the end effector to attempt a grasp of the object at the candidate grasp pose of the end effector.

2. The method of claim 1, further comprising:
generating a local geometry representation using the encoding and the candidate grasp pose of the end effector; and
including the local geometry representation in the one or more inputs applied to the grasp outcome prediction network in generating the grasp outcome prediction.

3. The method of claim 2, wherein generating the local geometry representation comprises performing dense sampling on the encoding from a frame of reference of the candidate grasp pose of the end effector.

4. The method of claim 1, wherein the encoding is invariant to any vision sensor pose of the vision sensor.

5. The method of claim 1, wherein the trained neural network encoder is trained in conjunction with a three-dimensional neural network decoder.

6. The method of claim 5, wherein the trained neural network encoder is trained based on applying training encodings generated over the neural network encoder to the three-dimensional decoder, generating training decodings over the three-dimensional decoder, determining losses based at least in part on the training decodings, and updating the neural network encoder based on the losses.

7. The method of claim 1, wherein the geometry features encoded by the encoding include three-dimensional shape features of the object.

8. The method of claim 1, wherein applying the one or more inputs to the grasp outcome prediction network comprises:
applying the current image as at least part of a first input, of the one or more inputs, to one or more first layers; and
generating, over the first layers based on applying the first input, a first layers output.

9. The method of claim 8, wherein applying the one or more inputs to the grasping outcome prediction network further comprises:
applying the encoding and the first layers output as at least part of a second input, of the one or more inputs, to one or more second layers; and
generating, over the second layers based on applying the second input, a second layers output.

10. The method of claim 9, wherein applying the one or more inputs to the grasping outcome prediction network further comprises:
applying the end effector pose and the second layers output as at least part of a third input, of the one or more inputs, to one or more third layers; and
generating, over the third layers based on applying the third input, a third layers output.

11. The method of claim 10, further comprising:
generating a local geometry representation using the encoding and the candidate grasp pose of the end effector;
applying the third layers output and the local geometry representation as at least part of a fourth input, of the one or more inputs, to one or more fourth layers; and
generating, over the fourth layers based on applying the fourth input, the grasp outcome prediction.

12. The method of claim 1, wherein determining the candidate grasp pose comprises:
generating a plurality of candidate grasp poses; and
performing one or more iterations of cross-entropy optimization on the plurality of candidate grasp poses to select the candidate grasp pose from the plurality of candidate grasp poses.

13. The method of claim 1, further comprising:
identifying a current vision sensor pose of the vision sensor; and
including the current vision sensor pose in one or more of the inputs applied to the grasp outcome prediction network.

14. A method implemented by one or more processors, comprising:
identifying a current image captured by a vision sensor of a robot, the current image capturing an end effector of the robot and an object to be grasped by the robot using the end effector;
generating an encoding of: the current image, or an additional image that captures the object; wherein generating the encoding comprises processing the current image or the additional image using a trained neural network encoder, and wherein the generated encoding encodes geometry features of the object;
applying, as one or more inputs to a prediction network: the current image and the encoding, wherein the prediction network is a trained neural network model;
generating a prediction using the prediction network based on the one or more inputs;
determining that the outcome prediction satisfies one or more criteria; and
in response to the prediction satisfying one or more criteria, providing, to one or more actuators of the robot, control commands that are based on the prediction.

15. The method of claim 14, further comprising:
generating a local geometry representation using the encoding; and
including the local geometry representation in the one or more inputs applied to the prediction network in generating the prediction.

16. The method of claim 15, wherein generating the local geometry representation comprises performing dense sampling on the encoding.

17. The method of claim 14, wherein the encoding is invariant to any vision sensor pose of the vision sensor.

18. The method of claim 14, wherein the trained neural network encoder is trained in conjunction with a three-dimensional neural network decoder.

19. The method of claim 18, wherein the trained neural network encoder is trained based on applying training encodings generated over the neural network encoder to the three-dimensional decoder, generating training decodings over the three-dimensional decoder, determining losses based at least in part on the training decodings, and updating the neural network encoder based on the losses.

20. A robot, comprising:
a vision sensor viewing an environment;
a trained neural network encoder and a trained grasp outcome prediction network stored in one or more non-transitory computer readable media;
one or more processors processor configured to:
identify a current image captured by the vision sensor, the current image capturing an object to be grasped by the robot using the end effector;

determine a candidate grasp pose of the end effector;
generate an encoding of: the current image, or an additional image that captures the object; wherein in generating the encoding one or more of the processors are to generate the encoding by processing the current image or the additional image using the trained neural network encoder, and wherein the generated encoding encodes geometry features of the object;
apply, as one or more inputs to the trained grasp outcome prediction network: the current image, the candidate grasp pose, and the encoding;
generate, using the trained grasp outcome prediction network based on the one or more inputs, a grasp outcome prediction; and
provide control commands to one or more actuators of the robot based on the grasp outcome prediction.

* * * * *